United States Patent Office 3,433,851
Patented Mar. 18, 1969

3,433,851
DEHYDROGENATION PROCESS WITH CATALYST PRETREATING FOR $C_6$–$C_{24}$ ALKENES
Kestutis A. Keblys, Southfield, Mich., assignor to Ethyl Corporation, New York, N.Y., a corporation of Virginia
No Drawing. Filed Nov. 7, 1966, Ser. No. 592,343
U.S. Cl. 260—683.3
Int. Cl. C07c 5/18
8 Claims

ABSTRACT OF THE DISCLOSURE

In dehydrogenation of dodecane to $C_{12}$ alkenes over a heterogeneous catalyst, poor selectivity (unwanted aromatization) occurs during the initial time on stream. Operation at high temperatures (525–600° C.) during such initial period (0.5–6.0 hours) for each of 15 fresh catalysts gave better selectivity during the subsequent period at lower temperatures (420–500° C.) compared to the unfavorable product distribution during an initial period at such lower temperatures. Any of a variety of hydrocarbon feeds may be used for the line-out period.

---

The present invention relates to an improved dehydrogenation process. It further relates to a paraffin dehydrogenation process which provides a substantially increased olefin yield. More particularly it relates to an improved dehydrogenation process in which a heterogeneous dehydrogenation catalyst is pretreated to improve its selectivity.

The catalytic dehydrogenation of paraffins is well known in the art. Many processes and catalysts are employed to effect this dehydrogenation. A problem in catalytic dehydrogenation of $C_6$ and higher paraffins is that the product obtained is usually a mixture of olefins, aromatics and cracked hydrocarbons. The relative amount of aromatic compounds in the product, generally, is quite high. It is desirable to increase the olefin yield and decrease the unwanted aromatic by-products.

This invention provides such a process. By utilizing the process of this invention, the amount of olefins in the product of a catalytic dehydrogenation of $C_6$ and higher paraffins is unexpectedly increased while the aromatics are generally decreased.

The object of this invention is to provide an improved process for catalytically dehydrogenating a normal paraffin having 6 or more carbon atoms. Another object of this invention is to provide a method for treating a heterogeneous dehydrogenation catalyst in order to improve its selectivity. The term selectivity is explained below. These and other objects of the invention will be made clear in the description and claims to follow.

An embodiment of this invention by which these objects are accomplished is a dehydrogenation process which comprises:

(a) preparing a treated catalyst by contacting a heterogeneous dehydrogenation catalyst with a fluid hydrocarbon at a temperature of from about 525° C. to about 600° C., at a liquid hourly space velocity of from about 0.1 to about 6, for from about 30 minutes to about 6 hours, (b) contacting a normal paraffin-containing feed stock wherein said paraffin has from 6 to about 24 carbon atoms with said treated catalyst at a temperature of about 425° C. to about 500° C. at a liquid hourly space velocity of 0.5 to 10.

Another embodiment of this invention is the dehydrogenation process described above wherein the temperature of preparing the treated catalyst is from 525° C. to about 550° C.

Still another embodiment of this invention is the dehydrogenation process described above wherein the fluid hydrocarbon used to treat the catalyst is selected from the class consisting of paraffins, paraffin wax, olefins, alkylated aromatics and mixtures thereof.

A preferred embodiment of this invention is the dehydrogenation process described above wherein said heterogenous dehydrogenation catalyst is selected from the class consisting of (a) metal oxides selected from the group consisting of molybdenum oxide, chromium oxide, cobalt oxide, magnesium oxide, zinc oxide, copper oxide, bismuth oxide and manganese dioxide,
(b) said metal oxides on alumina,
(c) metal salts of oxygenated inorganic acids wherein the metals are selected from the class consisting of divalent metals and trivalent metals, and
(d) mixtures of (a), (b) and (c).

The following catalyst compositions are used in more preferred embodiments of the dehydrogenation process of this invention: 30 to 70 percent zinc chromate—30 to 70 percent zinc oxide; 5 to 20 percent chromia—0 to 5 percent magnesium oxide on alumina; 5 to 15 percent molybdenum oxide on alumina.

The dehydrogenation process with which this invention is concerned is a catalytic dehydrogenation process. That is, it is a process in which a normal paraffin is contacted with a heterogeneous catalyst at an elevated temperature to yield a corresponding olefin.

A feature of the dehydrogenation process of this invention is that two steps are involved. The first step is one in which the selectivity of the catalyst is improved. The selectivity of a catalyst is a measure of its ability to favor olefin formation over aromatic formation. The higher the ratio of olefins to aromatics in the product, the more selective the catalyst is. Thus, the catalyst is treated in such a way as to improve, in effect, the yield of olefin. The catalyst thus treated is then used in the second step in the process. Here, a paraffin is dehydrogenated to yield olefins and by-products.

Catalysts which are useful in the practice of this invention encompass a broad range of compound types. Thus, useful types are (i) metal oxides such as molybdenum oxide, chromium oxide, bismuth oxide and the like (ii) di- and trivalent metal salts of inorganic oxygenated acids such as zinc chromate, zinc chromite, cobalt molybdate, nickel tungstate and the like, and (iii) mixtures thereof such as zinc oxide and zinc chromate and the like. The catalysts may also be used on an inert carrier such as alumina or magnesia.

Although some catalyst systems show greater improvement in selectivity than others after being treated at 525–600° C., in general, any heterogenous dehydrogenation catalyst which is stable under activation conditions of this invention may be used.

In step one of the process of this invention, the catalyst is treated with a fluid hydrocarbon. This is the catalyst activation step. The type of fluid hydrocarbon used is not critical. The fluid hydrocarbon can suitably be selected from paraffins, paraffin wax, olefins, aromatics, alkylated aromatics and mixtures thereof. Examples of hydrocarbons which are useful for this treatment are $C_1$ to $C_{20}$ normal paraffins, their isomers, and mixtures thereof; kerosenes; $C_8$ to $C_{12}$ cyclic, saturated and olefinic hydrocarbons; $C_8$ to $C_{20}$ paraffins containing up to 10 percent olefins and up to 50 percent aromatics; alkylated aromatics having 7 to 20 carbon atoms; paraffin wax and the like. Thus, it is possible in this step to use a waste or commercially unattractive hydrocarbon stream to treat the catalyst. Although the reason behind the activation is not fully understood, it is theorized that during the treatment with the fluid hydrocarbon at 525–600° C., the aromatization sites on the catalyst are effectively blocked.

In the second step of the process of this invention, a stream containing at least one normal paraffin having from 6 to about 20 carbon atoms is used. The preferred paraffins are normal paraffins having 10 to 18 carbon atoms. As a practical matter, the same paraffin being dehydrogenated may be conveniently used in step one to treat the catalyst.

The hydrocarbon fluid and the n-paraffin bearing feed may be in the liquid or gaseous state in carrying out this process. The physical state of the hydrocarbon contacting the catalyst will depend on the temperature and pressure which is used. The process is carried out equally as well whether the feed stream is a liquid or a gas.

The rate at which the fluid hydrocarbon or n-paraffin contacts the catalyst is referred to as the space velocity. The space velocity in the present process is expressed as a liquid hourly space velocity. It is a numerical expression of the ratio of the liquid volume of hydrocarbon to volume of catalyst which passes through the system, per hour. It is herein abbreviated as LHSV.

With regard to step one, i.e., the activation step, the LHSV may range from 0.1 to about 6. A preferred LHSV range is 0.1 to about 3.

Regarding the LHSV at which the step 2 of the dehydrogenation is carried out, an acceptable range is 0.5 to about 10. The preferred range here is from about 0.5 to about 6. In either step, however, a LHSV outside these ranges can also be used.

The temperature at which the catalyst is treated in step 1 may range from 525° C. to about 600° C. The preferred temperature range is 525° C. to 550° C. The time of treating the catalyst may be varied from 15 minutes to about six hours. A preferred treating time is 2 to 4 hours.

The second step of the dehydrogenation process of this invention is carried out at temperatures of from 400° C. to about 500° C. The preferred temperature range is 430° C. to about 500° C.

The advantage which the present invention provides is an unexpected improvement in the selectivity of the catalyst. In catalytic dehydrogenation, the purpose is to obtain olefins from paraffins. Ordinarily the product obtained is a mixture of olefins, aromatics and cracking products. The overall conversion of product is usually low, being of the order of 10 to 20 percent; that is, about 10 to 20 percent of the pariffin passing over the catalyst is dehydrogenated. By using the process of the present invention, the percentage of olefin in the product is increased while the aromatic content is generally decreased.

The following examples illustrate the unexpected improvement in olefin yield obtained by using the process of this invention. All product analyses are by gas chromatogrpahy. The percentage is the percent of individual component in the total conversion product.

Example 1

A catalyst bed consisting substantially of 66 percent zinc chromate and 34 percent zinc oxide was prepared. The temperature of the catalyst was raised to 500° C. and a feed consisting essentially of n-dodecane was brought in contact with the bed at a liquid hourly space velocity of 2.0. The product contained 58 percent $C_{12}$ olefins, 24 percent aromatics and 18 percent cracking products.

Example 2

A catalyst bed was prepared as in Example 1. The bed was heated to 540° C. and a feed consisting essentially of n-dodecane was brought in contact with the catalyst at a liquid hourly space velocity of 1.0 for 2.5 hours. The temperature was then lowered to 500° C. and the n-dodecane feed was passed through the catalyst at a liquid hourly space velocity of 2.0. The product obtained contained 71 percent $C_{12}$ olefins, 0 percent aromatics and 29 percent cracking products.

Similar results are obtained when the catalyst composition used in the examples above is 30 percent zinc chromate—70 percent zinc oxide; 60 percent zinc chromate—40 percent zinc oxide; 70 percent zinc chromate—30 percent zinc oxide.

Example 3

A catalyst bed was prepared using a 3.5 percent CoO— 14 percent $MoO_3$ on alumina catalyst. The bed was heated to 500° C. and n-dodecane was passed through the catalyst at a LHSV of 1.0. The product contained 9.3 percent $C_{12}$ olefins, 83.8 percent aromatics and 6.9 percent cracking products.

Example 4

A catalyst bed was prepared using the same catalyst composition as in Example 3. The bed was heated to 540° C. and n-dodecane was passed through the bed at a LHSV of 1.0 for three hours.

The temperature was then lowered to 500° C. and the n-dodecane was passed through the catalyst bed at a LHSV of 1.0. The product at this point contained 57.1 percent $C_{12}$ olefins, 13.4 percent aromatics and 30.5 percent cracking products.

Comparing the product of Example 1 with the product of Example 2, the striking increase in percent olefin yield is demonstrated. In Example 1, the product contains 58 percent $C_{12}$ olefins and 24 percent aromatics. In Example 2, in which the same catalyst was used, but after being treated at 540° C., the product contains 71 percent olefins and 0 percent aromatics. A similar observation is made in comparing Example 3 with Example 4. Thus, these examples serve to point out the striking and totally unexpected increase in percent olefin and the dramatic decrease in aromatics which result in carrying out the dehydrogenation according to the process of this invention.

The following examples further illustrate, but do not limit the process of this invention.

Example 5

A catalyst bed was prepared using 5 percent molybdenum oxide—5 percent bismuth oxide on alumina. The bed was heated to 540° C. and n-dodecane feed was passed through the catalyst at an LHSV of 1.0 for three hours.

The temperature was reduced to about 500° C. and the n-dodecane feed was passed through the bed at an LHSV of 3.0. The product at this point contained 46 percent $C_{12}$ olefins, 27.7 percent aromatics and 26.3 percent cracking products.

Analogous results are obtained when the feed is n-octadecane, n-pentadecane, n-decane, n-heptane, n-tridecane and the like.

Example 6

A feed consisting essentially of n-dodecane was brought into contact with a 3 percent cobalt oxide—12 percent molybdenum oxide (as cobalt molybdate) catalyst on alumina at 540° C. at a liquid hourly space velocity of 1.0 for three hours. The temperature was then lowered to about 475° C. and n-dodecane was passed through the catalyst at a liquid hourly space velocity of 1.0. The product obtained ocntained 58 percent $C_{12}$ olefins, 11 percent aromatics and 31 percent cracking products.

Similar results are obtained when one of the following fluid hydrocarbon compositions is used to contact the catalyst at 540° C. instead of n-dodecane: 50 percent benzene, 50 percent dodecane; 8 percent decene, 2 percent toluene, 1 percent cyclohexane, 89 percent decane; 30 percent benzene, 30 percent toluene, 40 percent xylene; 10 percent isobutene, 10 percent pentane, 80 percent hexane; 80 percent eicosene, 10 percent octadecane, 10 percent pentane; 100 percent hexadecane.

Example 7

A copper chromite catalyst bed is prepared. A mixed hydrocarbon feed comprising 4 percent aromatics, 6 percent $C_{12}$ olefin, 4 percent $C_6$ to $C_{10}$ olefin, 4 percent $C^6$ to $C_{10}$ paraffin and the remainder being $C_{12}$ paraffin is brought into contact with this catalyst at 525° C. at a space velocity of 1.5 for six hours. The temperature is then lowered to 475 C. and n-eicosane is passed through the catalyst at a space velocity of 0.5. The product obtained is analogous to that obtained in Examples 2 through 6.

Example 8

A catalyst bed is prepared consisting of 9 percent CuO and 5 percent molybdenum oxide on alumina. A hydrocarbon feed consisting of a mixture of 50 percent $C_{10}$ paraffin, 25 percent alkylated benzenes, and about 25 percent $C_{12}$ olefins is brought into contact with the catalyst at 600° C. at a space velocity of 4.0 for 15 minutes. The temperature is then lowered to about 420° C. and n-hexane is passed through the catalyst at a liquid hourly space velocity of 3.5. The product obtained is a mixture of hexenes, aromatics and cracking products analogous to the products obtained in Examples 2, 4, 5–7.

In order to further demonstrate the significant advantage in olefin yield which the present invention affords, a series of identical dehydrogenation runs were made using treated and untreated catalysts. The following procedures were used:

*Untreated catalyst*—A catalyst bed was prepared. The catalyst bed was then heated to 500° C. and n-dodecane was passed through the catalyst at a liquid hourly space velocity of 1.0. The product was analyzed by gas chromatography.

*Treated catalyst*—A catalyst bed was prepared the same as the untreated catalyst. This bed was then heated to 540° C. and a fluid hydrocarbon was passed over the catalyst for three hours at a liquid hourly space velocity of 1.0. The catalyst bed was then cooled to 500° C. and n-dodecane was passed through the catalyst at a liquid hourly space velocity of 1.0. The product was analyzed gas chromatography.

The results of the analysis of the products obtained in this series of dehydrogenation runs is contained in the following table. The percent olefin and percent aromatics are expressed as percent of total effluent stream. This serves better to illustrate the selectivity improvement.

TABLE I

| No. | Catalyst composition | Untreated catalyst, percent | | Treated catalyst, percent | |
|---|---|---|---|---|---|
| | | $C_{12}$ olefins | Aromatics | $C_{12}$ olefins | Aromatics |
| 1 | 31% ZnCrO$_4$-69% ZnO. | 8.8 | 21.0 | 10.3 | 3.5 |
| 2 | 14.6% Cr$_2$O$_3$ on alumina. | 6.7 | 53.0 | 8.8 | 9.0 |
| 3 | 5% MoO$_3$-5% Bi$_2$O$_3$ on alumina. | 4.4 | 26.0 | 7.1 | 12.7 |
| 4 | 5% Cr$_2$O$_3$ on alumina. | 7.1 | 36.0 | 7.7 | 12.5 |
| 5 | 10% MoO$_3$ on alumina. | 5.2 | 24.5 | 9.3 | 1.5 |
| 6 | 6% Ni-19% W (as sulfided nickel tungstate) on alumina.[1] | 3.9 | 20.0 | 8.8 | 3.0 |
| 7 | 12% Cr$_2$O$_3$-2% MgO on alumina. | 8.6 | 42.0 | 10.3 | 5.5 |
| 8 | 59% Cr$_2$O$_3$-10% CuO-31% Al$_2$O$_3$. | 7.8 | 46.0 | 9.9 | 9.5 |
| 9 | 3% Cobalt oxide-12% molybdenum oxide on alumina. | 2.4 | 30.5 | 8.4 | 6.5 |
| 10 | 6% MoO$_3$-3% MnO$_2$ on alumina. | 2.4 | 12.2 | 4.9 | 4.0 |
| 11 | 38% ZnO-25% Cr$_2$O$_3$ on alumina. | 7.8 | 20.5 | 7.0 | 4.5 |

[1] Harshaw catalyst Ni-4403-E.

It is readily apparent from the data presented in Table I that the process of this invention truly does improve the olefin yield in catalytic dehydrogenation. Consider, for example, the data in Table I for catalyst composition No. 1; the olefin and aromatic content of the product using the untreated catalyst was 8.8% $C_{12}$ olefins and 21 percent aromatics. Using the same catalyst treated as per the procedure outlined above, the $C_{12}$ olefin and aromatic content was 10.3% and 3.5%, respectively. Thus, by treating the catalyst per the process of this invention, it is clear that the olefin yield and catalyst selectivity are significantly improved.

The products produced by the process of this invention are mixtures of monoolefin isomers having the same number of carbon atoms as the paraffin starting material. Thus, when n-dodecane is used as a paraffin feed, the olefin portion of the product obtained is a mixture of dodecene isomers.

The olefins produced by the process of this invention are well known compounds and have the many utilities which are known for them. For example, they are valuable chemical intermediates and can be transformed into acids by an ozonolysis reaction. Thus, for example, tetradecene-2 can be reacted with ozone to yield lauric acid, a detergent range acid. Similarly, the other olefins produced by this process can be ozonized to yield the corresponding acids. When ozonizing the products of the process of this invention, the reaction is generally carried out at a low temperature; e.g., from −50 to about 10° C. After the ozonization reaction is completed, the resultant reaction mixture is usually treated with another oxidant such as air or oxygen to obtain the product acid. The secondary oxidation is usually carried out at a temperature within the range of 20 to 90° C. Solvents which can be employed in the ozonolysis of olefins include inert solvents such as chloroform and carbon tetrachloride or hydroxylic solvents such as methanol and acetic acid.

The present invention, namely, an improved dehydrogenation process is described above and substantiated by the data presented. Claims to this invention follow. It is intended that this invention be limited only within the spirit and lawful scope of these claims.

I claim:
1. A dehydrogenation process which comprises:
   (a) preparing a treated catalyst by contacting a heterogeneous dehydrogenation catalyst with a fluid hydrocarbon at a temperature of from about 525° C. to about 600° C., at a liquid hourly space velocity of from about 0.1 to about 6, for from about 30 minutes to about 6 hours,
   (b) contacting a normal paraffin-containing feed stock wherein said paraffin has from 6 to about 24 carbon atoms with said treated catalyst at a temperature of about 425° C. to about 500° C. and at a liquid hourly space velocity of 0.5 to 10.

2. The dehydrogenation process of claim 1 wherein the temperature of preparing the treated catalyst is from 525° C. to about 550° C.

3. The dehydrogenation process of claim 1 wherein said fluid hydrocarbon is selected from the class consisting of paraffins, paraffin wax, olefins, aromatics, alkylated aromatics, and mixture thereof.

4. The dehydrogenation process of claim 1 wherein said heterogenous dehydrogenation catalyst is selected from the class consisting of
   (a) metal oxides selected from the group consisting of molybdenum oxide, chromium oxide, cobalt oxide, magnesium oxide, zinc oxide, copper oxide, bismuth oxide and manganese dioxide,
   (b) said metal oxides on alumina,
   (c) metal salts of oxygenated inorganic acids wherein the metals are selected from the class consisting of divalent metals and trivalent metals, and
   (d) mixtures of (a), (b) and (c).

5. The dehydrogenation process of claim 4 wherein the catalyst is a composite containing 30–70 percent zinc chromate and 30–70 percent zinc oxide.

6. The dehydrogenation process of claim 4 wherein the catalyst is 14.6 percent chromium oxide on alumina.

7. The dehydrogenation process of claim 4 wherein the catalyst is 12 percent chromium oxide and 2 percent magnesium oxide on alumina.

8. The dehydrogenation process of claim 4 wherein the catalyst is 10 percent molybdenum oxide on alumina.

References Cited

UNITED STATES PATENTS 3,293,319  12/1966  Haensel et al. _____ 260—683.3
3,315,007  4/1967   Abell et al. _____ 260—683.3

DELBERT E. GANTZ, *Primary Examiner.*

G. E. SCHMITKONS, *Assistant Examiner.*